United States Patent [19]

Mitchell

[11] 4,319,311

[45] Mar. 9, 1982

[54] READILY COLLAPSABLE PORTABLE LIGHTING SYSTEM HAVING A SIMPLIFIED HOLDER FOR COLOR FILTERS

[76] Inventor: W. Phillip Mitchell, 717 Clark St., Maryville, Tenn. 37801

[21] Appl. No.: 27,712

[22] Filed: Apr. 6, 1979

Related U.S. Application Data

[63] Continuation-in-part of Ser. No. 829,187, Aug. 30, 1977, Pat. No. 4,167,783.

[51] Int. Cl.³ .................. F21V 21/22; F21V 21/30
[52] U.S. Cl. .................. 362/250; 362/251; 362/295; 362/370; 362/418; 362/426; 362/431; 362/433; 403/245
[58] Field of Search .......... 362/2, 230, 251, 293, 362/295, 318, 324, 367, 370, 371, 391, 426, 430, 431, 227, 123, 418; 248/226.5, 125, 158; 403/88, 400, 245, 230; 350/318

[56] References Cited

U.S. PATENT DOCUMENTS

| | | | |
|---|---|---|---|
| 307,658 | 11/1884 | Johnson | 403/188 |
| 1,076,838 | 10/1913 | Okun | 403/230 |
| 1,291,964 | 1/1919 | McCormick | 362/318 |
| 1,811,315 | 6/1931 | Herren | 248/158 |
| 1,916,154 | 6/1933 | Lowry | 362/431 |
| 1,941,503 | 1/1934 | Villiers | 362/233 |
| 2,591,685 | 4/1952 | DuMais | 248/125 |
| 2,659,038 | 11/1953 | Heyer | 362/233 |
| 2,734,129 | 2/1956 | Kahala | 362/293 |
| 2,857,506 | 10/1958 | Minteer | 362/123 |
| 2,858,266 | 10/1958 | Schneider | 403/400 |
| 2,894,693 | 7/1959 | Howarth | 362/371 |
| 3,017,497 | 1/1962 | Albright | 362/394 |
| 3,346,225 | 10/1967 | Smith | 248/125 |
| 3,586,270 | 7/1971 | Loffler | 362/61 |
| 3,848,701 | 11/1974 | Hughes | 403/188 |
| 3,886,349 | 5/1975 | Arai | 362/306 |
| 3,989,213 | 11/1976 | Allen | 248/226.5 |
| 4,037,097 | 7/1977 | Stillman | 350/318 |
| 4,044,934 | 8/1977 | Peters | 248/226.5 |
| 4,068,931 | 1/1978 | Weaks | 350/318 |
| 4,142,703 | 3/1979 | Moretto | 403/400 |
| 4,220,981 | 9/1980 | Koether | 362/431 |

FOREIGN PATENT DOCUMENTS

| | | | |
|---|---|---|---|
| 479617 | 12/1951 | Canada | 248/125 |
| 176147 | 8/1961 | Sweden | 403/188 |
| 279411 | 3/1952 | Switzerland | 403/230 |
| 1428558 | 3/1976 | United Kingdom | 403/230 |

OTHER PUBLICATIONS

Webster's New Collegiate Dictionary, 5th ed., 1977, p. 993.

Primary Examiner—Richard E. Schafer
Assistant Examiner—Edward F. Miles
Attorney, Agent, or Firm—Pitts & Kesterson

[57] ABSTRACT

A portable lighting system which includes a stand having an adjustable effective length which positions lights carried on a frame at a predetermined vertical position with respect to a supporting surface. The frame is releasably secured to the stand and can readily be set up and dismantled for transport in a compact space. Lights carried by the frame include a new and simple technique for attaching the gelatine filter holders, and may be connected to a foot operated control box which includes switches actuated to energize preselected lights or groups of lights. The energized lights or preselected energized lights can be intensity modulated with a foot operated dimmer while leaving the operator's hands free to play a musical instrument.

9 Claims, 7 Drawing Figures

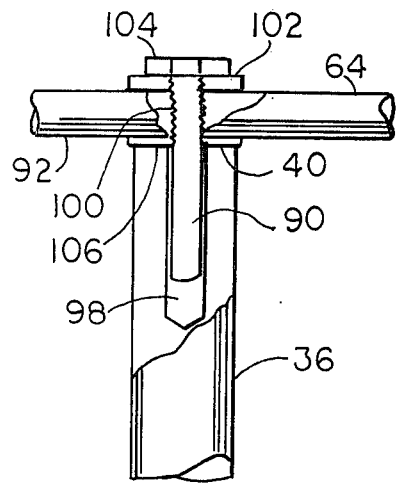
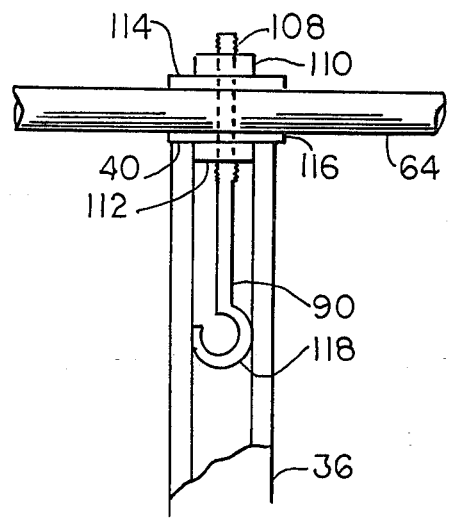
FIG. 2A  FIG. 2B
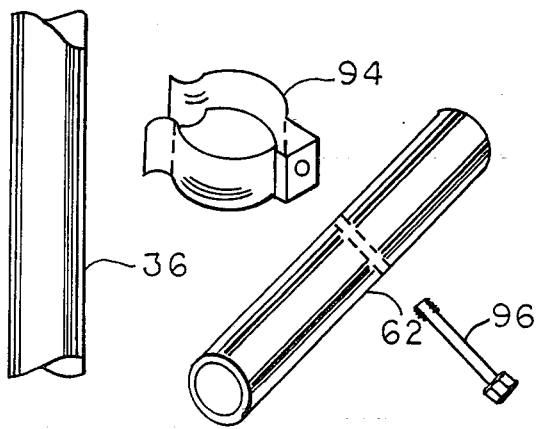
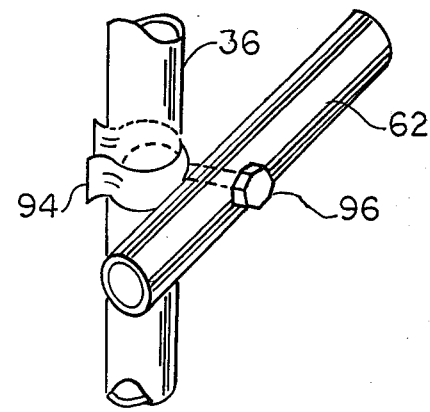
FIG. 3A  FIG. 3B
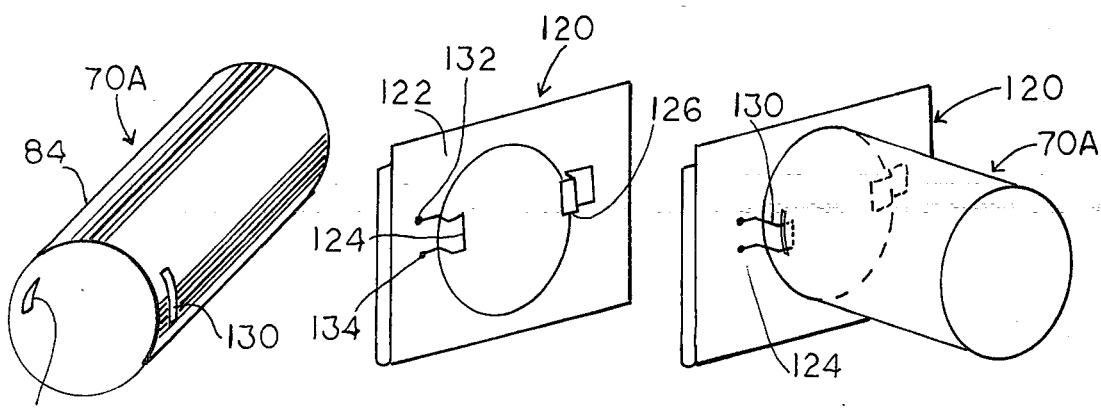
FIG. 4A  FIG. 4B

READILY COLLAPSABLE PORTABLE LIGHTING SYSTEM HAVING A SIMPLIFIED HOLDER FOR COLOR FILTERS

BACKGROUND OF THE INVENTION

This application is a "continuation in part" of application Ser. No. 829,187 filed Aug. 30, 1977, by the present applicant, William P. Mitchell which issued as U.S. Pat. No. 4,167,783 on Sept. 11, 1979. The title of U.S. Pat. No. 4,167,783 is *Portable Lighting Systems Having A Foot Operated Dimmer.*

The present invention relates to portable lighting systems, and more particularly to easily assembled portable lighting systems.

Lighting systems for stages are well known and commonly include a console which is provided with controls adapted for energizing and varying the intensity of preselected lights. The lights can be carried by adjustable frames which serve to direct the lights to a chosen section of a stage. For example, U.S. Pat. No. 2,659,038 discloses a lighting system for automatically controling the illumination of one or a plurality of stages or sets. This prior art system includes a control panel from which pin type switch buttons are connected to an energy supply over cables and selectively energize lamps.

SUMMARY

While certain of the prior art systems are well adapted for use as fixtures in permanently installed lighting systems, the systems are not believed to be well suited for use as portable units which can be readily set up and dismantled by a layman not having particular skills as an electrician. Accordingly, the system of the present invention includes at least one lighting tree having a stand, and frame which is releasably mounted on the stand. The frame carries a plurality of lights which can be adjusted for directing light in a preselected direction. The lights are selectively energized, and may be arranged in groups having one or more lights of various colors which are energized by switches. The various colors of the lights may be achieved by using standard gelatine color filter sheets which are attached to the body of the light by a unique technique. Certain of the lights may be intensity modulated by a foot operated dimmer for creating desired stage light effects. The system including the control circuitry can readily be set up and dismantled by a single operator. Moreover, the lights can be selectively energized and intensity modulated by the foot of an operator leaving the operator's hands free to play a musical instrument, for example. To facilitate carrying the system after it is dismantled, the various competents are manufactured from light weight materials, preferably. Moreover, the cost of manufacturing the system is relatively inexpensive making the system particularly desirable for single musicians on short term engagements at night clubs or the like.

BRIEF DESCRIPTION OF THE DRAWINGS

Other objects and advantages of the present invention will become apparent upon reading the following detailed specification together with the drawings wherein:

FIGS. 2A and 2B show two embodiments of how the top support bar of the frame attaches to the stand in the easily assembled light tree of this invention.

FIGS. 3A and 3B show a disassembled and assembled view of how the bottom support bar attaches to the stand in the easily assembled light tree of this invention.

FIGS. 4A and 4B show a disassembled and assembled view of the simple technique of attaching the color gelatine holders to the lights of this invention.

DESCRIPTION OF THE INVENTION

Figure 1:
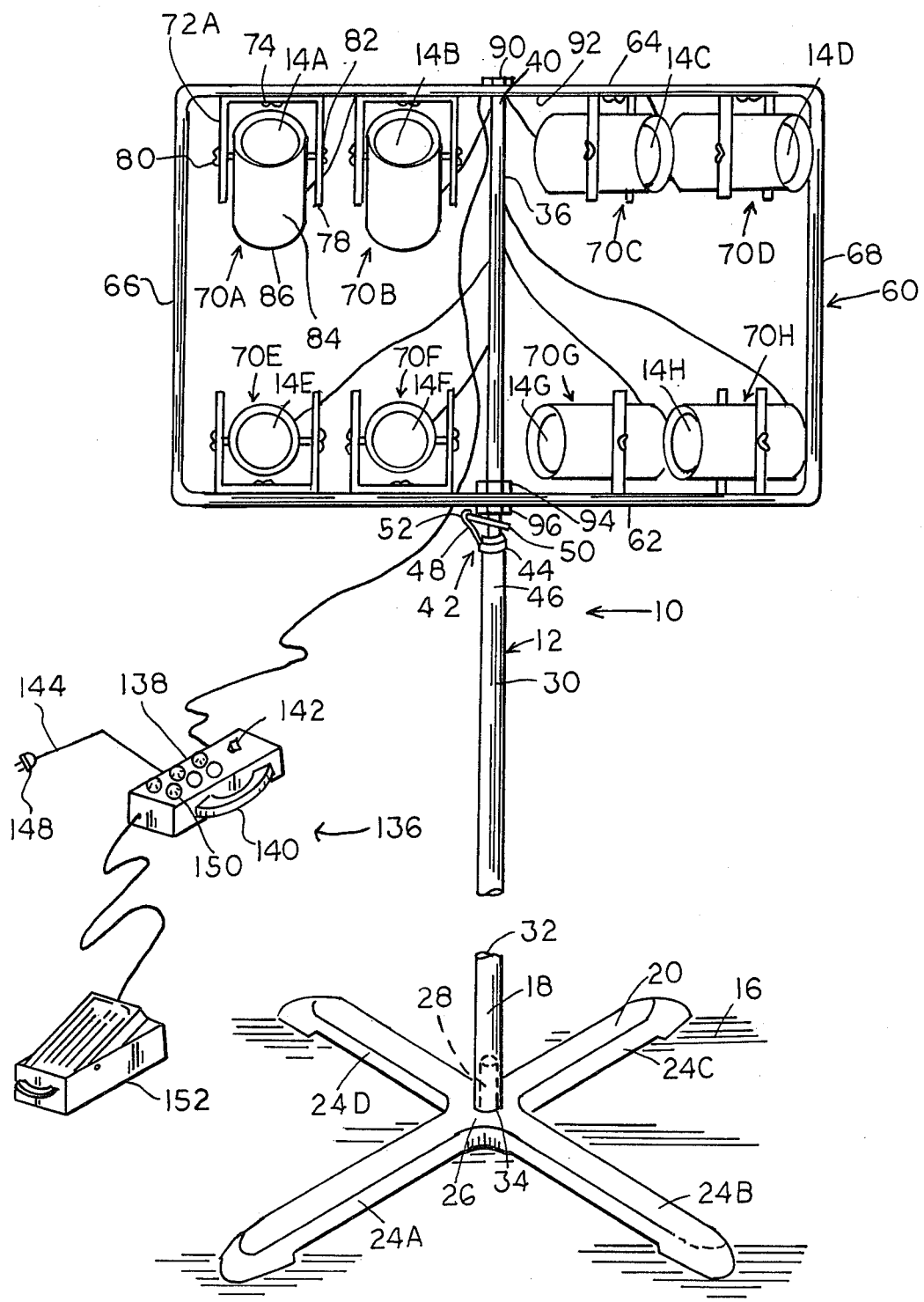
FIG. 1 is a perspective view of a lighting system constructed in accordance with various features of the invention.

Referring now to the drawings, a lighting system embodying various features of the present invention is illustrated generally at 10 in FIG. 1. The illustrated lighting system is adapted for use as in stage lighting and finds particular application as a portable unit which can be operated by a single musician as he simultaneously plays before an audience.

The system 10 includes a light tree 12 which supports a plurality of lights 14 A-H which can be adjusted vertically with respect to a supporting surface 16. More specifically, the tree 12 includes a stand 18 having a base 20 which engages the supporting surface 16 and includes four feet portions 24 A-D which extend outwardly at substantially equal angles from a central section 26. The central section of the stand carries a substantially upright stud 28 which is cylindrical and secured as by welding, or with a bolt extending through the base to the central section 26.

An elongated tubular member 30 fabricated from a suitable rigid material such as steel, aluminum, plastic or the like is releasably secured to the base 20 and maintained in an upright position. In this connection the lower end portion of the tubular member bore 32 telescopically receives the stud 28 and is advanced over the stud until the end edge 34 of the member 30 rests against the central section 26 of the base 20.

A further elongated member 36 is telescopically received within the bore 32 of the tubular member 30 and is substantially axially aligned with respect to the axis of the stud 28 and member 30. The combined effective length of the members 30 and 36 is adjustable by sliding the member 36 within the bore 32. More specifically, if it is desired to increase the combined effective length of the members 36 and 30, the member 36 is partially withdrawn from the bore 32. Contrawise, if it is desired to decrease the combined effective length of the members 30 and 36, the member 36 is advanced into the bore 32 of member 30.

Means are provided for fixing the relative position of the members 30 and 36 such that end 40 of member 36 and the lights are disposed at a preselected position with respect to the supporting surface 16. In this connection a suitable stop 42 of conventional design is provided which in the illustrated embodiment comprises a collar 44 fixedly secured as by a bolt or screw (not shown) to the end portion 46 of the member 30. This collar supports an arm 48 which projects outwardly from the axis of the member 30 and carries tab 50 at its end portion 52. This tab 50 is pivotally mounted on the outboard end portion 52 of the arm such that said tab 50 is free to tilt upwardly and downwardly. Tab 50 further defines an opening (not shown) which slidably receives the member 36 therethrough. As the member 36 slides downwardly into the member 30, the tab 50 frictionally engages the surface of member 36 and prevents further downward movement of the member 36. If it is desired to extend the member 36, i.e., withdrawn the member from the bore 32, the tab 50 is tilted upwardly such that the member 36 can slide freely within the bore 32 of member 30. Similarly, if it is desired to decrease the combined effective length of members 30 and 36 by inserting member 36 into bore 32 of rod 30, the tab 50 is rotated upwardly until the member 36 can freely slide within the tab opening and upon positioning the member 36 at a desired location the tab 50 is rotated downwardly until it frictionally engages the member 36 and holds the member 36, preventing further sliding motion of this member.

It will be recognized that alternate means may be provided for fixing the relative position of the members 30 and 36. For example, a suitable set screw (not shown) may be threadably received in a bore defined in the end portion 46 of the upright member 30 such that upon advancing the screw into the bore, one end of the screw engages the member 36 slidably received within the bore 32, for purposes of securing the member 36 in a fixed vertical position with respect to the member 30.

The lights of the system are carried by a frame 60 which in the illustrated embodiment is substantially rectangular in outline and includes a pair of substantially horizontally disposed members 62 and 64 which are joined at their opposite ends by a pair of substantially vertically disposed members 66 and 68. The substantially horizontally disposed members 62 and 64 may be integrally formed at their opposite ends with the substantially vertical members 66 and 68. Preferably the frame members 62-68 are fabricated from a lightweight and substantially rigid material such as sheet metal tubing, for example. The frame 60 is preferably fabricated from a lightweight material to facilitate carrying the system inasmuch as it is particularly adapted for use as a portable unit.

The orientation of the lights 14 A-H which are carried by the frame 60 can be adjusted in vertical and horizontal planes for illuminating predetermined areas of a stage, for example. In this connection each of the lights 14 A-H are mounted in brackets 70 A-H, respectively which are secured to the frame 60. More particularly, the brackets 70 A-D are secured to the cross or horizontally disposed frame member 64 and the brackets 70 E-H are secured to the horizontally disposed frame member 62. (See FIG. 1.) Each of the brackets 70 A-H are substantially identical and for this reason the bracket 70A only will be described in detail. The bracket 70A is rotatably mounted on the member 64 for purposes of rotating the light 14A about a vertical axis. The bracket 70A includes a clevis 72A which is rotatably secured to the member 64 by a bolt and companion wing nut 74. Arms 76 and 78 of the clevis are provided with registering bores which receive bolts 80 and 82 and are secured at their respective outboard ends to a substantially circular housing 84 which carries the light 14A. The light 14A is mounted in the housing 84 by a conventional socket (not shown) which is carried within the portion 86 of the housing as by a bracket or the like secured to the housing and substantially axially aligned with the housing axis 84. This socket threadably receives the base portion of the lights 14 therein. The housing 84 is rotatable within the clevis 72A such that the light 14A can be rotated within a vertical plane. The housing 84 further serves to shield and direct the illumination to a preselected location.

When the system is dismantled for storage or transport the lights and their respective housings can be secured to assist in preventing inadvertent movement of the lights which might result in damage. It will be recognized that by tightening the wing nut 74 movement of the light in a horizontal plane is restricted. Wing nuts 80 and 82 can be tightened to restrict movement in a vertical plane. Preferably, the housings are rotated until their axes are substantially parallel with the frame members 66 and 68 to assist in shielding the lights during transport.

To facilitate demounting the system 10 for purposes of packing, for example, after completion of a musical engagement the frame 60 is releasably secured to the upright member 36. To this end, a bolt 90 is received in a bore provided in the cross member 64 at its substantial mid portion. This bolt 90 is proportioned such that one end portion of its shaft extends through the cross member. The projecting portion of the bolt shaft is received within a bore provided within the end portion 40 of the member 36. Preferably, the member 36 is tabular, however, as necessary or desired the member 36 may comprise a solid rod having a bore opening on its end surface and proportioned for receiving the shaft of bolt 90 therein.

Upon positioning the bolt 90 within the bore of member 36, the underside 92 of member 64 is supportably engaged by the end portion 40 of the member 36. The cross member 62 is releasably secured to the member 36 by a spring clip 94 of conventional design. This clip 94 is U-shaped and secured to the cross member 62 by the bolt 96 and includes two juxtaposed prongs which expand apart for receiving the member 36 therebetween. The clip prongs then contract to engage the opposite sides of the member 36 and assist in joining member 36 and cross member 62.

Referring now to FIGS. 2A and 2B, there are shown two embodiments of how bolt 90 may be attached to cross member 64 and then placed in support member 36. According to FIG. 2A, support member 36 is a solid rod having a bore 98 drilled therein. Also as shown in this embodiment cross member 64 may also be tubular or solid. However, in any event, the hole through which bolt 90 extends is threaded to receive threaded portion 100 of bolt 90. Washer 102 is placed between the head 104 of bolt 90 and cross member 64. Another washer 106 may be placed between the end of support member 36 and the underside 92 of cross member 64. According to FIG. 2B, bolt 90 comprises an eyebolt having a threaded end 108 which is secured to cross member 64 by means of two nuts 110 and 112, and washers 114 and 116. The embodiment of FIG. 2B is especially suitable for use when both cross member 64 and support member 36 are of a tubular construction. In this embodiment, it is seen that it is desirable that the loop portion 118 of eyebolt 90 have a maximum diameter approximately the same size as the inside diameter of tubular support member 36. It will also be appreciated that bolt 90 of either FIG. 2A or FIG. 2B could be welded or otherwise permanently attached to cross member 64.

FIGS. 3A and 3B show in detail how spring clip 94 is secured to cross member 62 by bolt 96, and how it snaps on support member 36. It will also be appreciated that spring clip 94 could be welded or otherwise permanently attached to cross member 62.

When it is desired to dismantle the system, cross member 62 can be moved outwardly from the member 36 until clip 94 releases the member 36. The frame 60 can then be lifted upwardly sliding the bolt 90 from the bore of member 36. When the bolt 90 is removed from this bore, the frame 60 and its associated wiring can then be stored independently of the members 30 and 36.

In certain stage lighting applications it is desirable for multicolored lights to be used. In this connection, the lights 14 A-H can include various colors or lenses of various colors may be provided over the end of the housings 84 from which light is emited. In one embodiment, the lights are arranged in groups having different colors. For example, in one embodiment lights 14 A-B are white or spot lights, lights 14 C-D are red, lights E-F are amber and lights G-H are blue. By arranging the lights in multicolored groups different stage lighting effects can be achieved by energizing preselected groups of the lights. Moreover, inasmuch as the individual lights 14 A-H can be independently rotated in a vertical and horizontal plane, various sections of the stage can be illuminated as necessary or desired.

Referring now to FIGS. 4A and 4B there is shown a new and simple technique for attaching a colored gelatine holder to the circular housing 84 of one of the lights. According to this technique, a standard holder 120 for a colored gelatine sheet is provided. Attached to holder 120 at two locations slightly off center toward the top 122 of holder 120 are two tabs 124 and 126 which extend into slots 128 and 130 on circular housing 84 as is shown in FIG. 4B. As is shown in FIG. 4A, tab 124 may comprise a wire bent into the desired shape and attached at its ends at 132 and 134 by rivets or screws. Alternately, the tab may be a stamped piece of metal such as tab 126 which is welded or otherwise attached to gelatine holder 120. As will be appreciated by those skilled in the stage lighting art, this simple technique of attaching a gelatine holder to a light is much superior to presently available methods, as it results in a lightweight design, is simple and inexpensive to construct, and provides for freer circulation of air around the sheet of gel material and its holder. Further, the intensity of the individual lights or groups of lights can be varied as necessary or desired as will be further described hereinafter.

Control circuitry generally indicated at 136 is provided for selectively energizing and controlling the intensity of the lights 14 and/or preselected groups of the lights. In the illustrated embodiment a portion of the circuitry 136 is carried in a control box 138 having a substantially rectangular outline and having wall panels which are fabricated from a suitable rigid material such as sheet metal. As shown in FIG. 1, the front panel is provided with a handle 140 which is secured by screws, bolts, or the like at its opposite ends to the panel at spaced locations. As shown in FIG. 1, control box includes a master on-off switch 142 which selectively energizes the system by applying power across to the system by means of cord 144 and plug 148 to a conventional power supply such as a wall outlet. This switch 142 is carried by the top panel of the control box and is operable by the foot of an operator. A suitable indicator lamp 150 is included for indicating when the switch is closed and power is applied to the system.

Also shown is a foot controlled rheostat 152 to control the light intensity as is more completely described in application Ser. No. 829,187, filed on Aug. 30, 1977, by the present inventor and which issued as U.S. Pat. No. 4,167,783 on Sept. 11, 1979.

Thus, although the present invention has been described with respect to a specific embodiment of an easily assembled light tree and gelatine holder, it is not intended that such specific embodiments be considered limitations upon the scope of the invention except insofar as is set forth in the following claims.

What is claimed is:

1. A portable lighting system suitable for easy assembly and disassembly and adapted for being driven by a common source comprising:
   a light tree including,
      base means resting on a horizontal support surface,
      a support member having an upper and lower end releasably attached to said base means at said lower end and said upper end extending vertically above said base means and support surface, said upper end including a bore extending vertically down into said support member,
   a substantially rectangular shaped light support frame having a top cross member and a bottom cross member said top and bottom cross members extending between two side members, said top cross member having an extension located substantially at a point on said top cross member equidistant between said side members and extending perpendicular from said top member in a downward and vertical direction, said perpendicular extension having a cross section suitable for fitting into said bore of said support member, and said bottom cross member including a resilient member attached substantially at a point on said bottom cross members equidistant between said side members and suitable for grasping said support member between said lower end and said upper end, said support frame being readily attached to and detached from said support member by inserting said perpendicular extension of said top cross member into said bore and grasping said support member with said resilient member attached to said bottom cross member, and
   a plurality of lights mounted on said light support frame; and
   control means connected to said source and each of said lights for controlling the intensity of at least one of said lights at a multiplicity of intensity levels including a foot operated rheostat.

2. The system of claim 1 comprising a bolt threaded through said top cross member to provide said perpendicular extension.

3. The lighting system of claim 1 wherein said perpendicular extension comprises an eyebolt secured to said top cross member.

4. The lighting system of claim 1 wherein said resilient member is a spring clip.

5. The lighting system of claim 1 wherein said support member includes an upright tubular member releasably attached to said base means, said tubular upright member having a selected inside diameter, an upright rod member having an outside diameter substantially equal to said inside diameter for carrying said support frame, said upright rod member suitable for sliding within said upright tubular member whereby the combined effective length of said tubular and rod member can be adjusted, and means for selectively fixing said tubular and rod members in a fixed relative position whereby said frame carrying said lights can be adjusted, vertically with respect to said supporting surface.

6. The lighting system of claim 1 wherein at least one of said plurality of lights includes cylindrical housing having two sides, a base end and a light projection end for providing a beam of light, and a cylindrical upper half and a lower cylindrical half, said cylindrical housing including two circumferential slots located at said light projection end of said cylindrical housing, both of said circumferential slots located in the upper cylindrical half of said housing, one on each side; and further comprising a color gelatine filter holder said holder having a front side, a back side, a top half, a bottom half and defining an aperture therethrough to allow the passage of a beam of light, said holder further having two tabs attached to the top half of said back side on each side of said aperture, one each of said tabs suitable for being received by a corresponding circumferential slot in said cylindrical housing, such that said holder is maintained in front of said light projection end of said cylindrical housing.

7. A portable lighting system having a quick mounted color gelatine filter holder and adapted for being driven by a standard energy source comprising:

at least one lighting tree including a collapsible stand, a frame carried by said stand and a plurality of lights mounted on said support frame, at least one of said lights including a cylindrical housing having two sides, a base end and a light projection end for providing a beam of light, and a upper cylindrical half and a lower cylindrical half, said cylindrical housing further including two circumferential slots located at said light projection end of said cylindrical housing, both of said circumferential slots located in the upper cylindrical half of said housing, one on each side;

control means connected to said source and each of said lights for controlling the intensity of at least one of said lights at a multiplicity of intensity levels including a foot operated rheostat; and a color gelatine filter holder, said holder having a front side, a back side, a top half, a bottom half and defining an aperture therethrough to allow the passage of a beam of light, said holder further having two tabs attached to the top half of said back side on each side of said aperture, one each of said tabs suitable for being received by a corresponding circumferential slot in said cylindrical housing such that said holder is maintained in front of said light projection end of said cylindrical housing.

8. The lighting system of claim 7 wherein said tabs are made of wire formed to a suitable shape.

9. The lighting system of claim 7 wherein said tabs are made of a solid material formed to a suitable shape.

* * * * *